Figure 1:
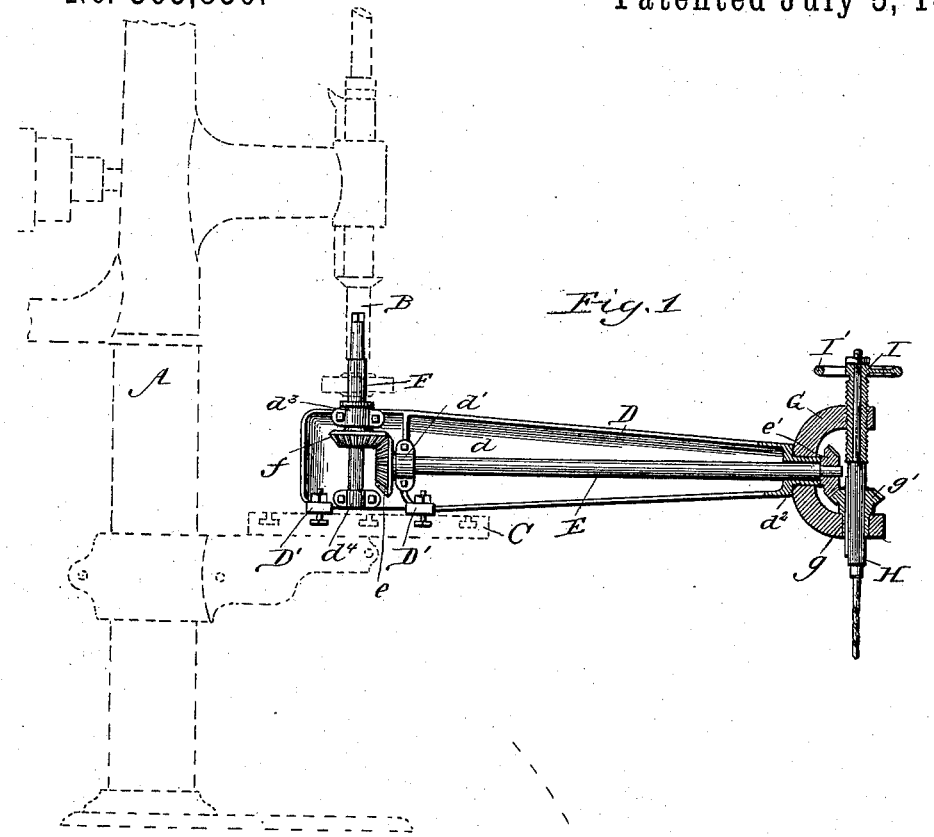

(No Model.)

J. O'NEIL.
DRILLING APPARATUS.

No. 365,850. Patented July 5, 1887.

Witnesses.
W. Rossiter
Wm. Roweart

Inventor:
John O'Neil
By Dayton & Poole
Attorneys

UNITED STATES PATENT OFFICE.

JOHN O'NEIL, OF TERRE HAUTE, INDIANA.

DRILLING APPARATUS.

SPECIFICATION forming part of Letters Patent No. 365,850, dated July 5, 1887.

Application filed September 13, 1886. Serial No. 213,305. (No model.)

*To all whom it may concern:*

Be it known that I, JOHN O'NEIL, of Terre Haute, in the county of Vigo and State of Indiana, have invented certain new and useful Improvements in Drilling Apparatus; and I do hereby declare that the following is a full, clear, and exact description thereof, reference being had to the accompanying drawings, and to the letters of reference marked thereon, which form a part of this specification.

The principal object of this invention is to provide a portable drilling apparatus or machine adapted for attachment to a suitable support—as for instance, the work-holder of a stationary drilling-machine—and by which the drill carried thereby may be brought into any desired position for use, and also may be given any desired direction with reference to the object to be drilled.

Another object of the invention is to provide a portable drilling apparatus which may be attached to the revolving work-holder of a stationary drilling-machine and actuated from the work-spindle thereof, and which is adapted for operating upon work which, on account of its shape or size, cannot be conveniently placed upon the work-holder of a drilling-machine of common form.

The invention consists of the matters hereinafter described, and pointed out in the appended claims.

The machine herein shown as embodying my invention comprises, essentially, an arm or frame adapted for attachment at one end to a suitable support, a longitudinal rotating shaft mounted in bearings in said arm, a transverse driving-shaft geared with the longitudinal shaft for transmitting motion to the latter, and a head swiveled upon the said arm with its axis of rotative motion concentric with that of the longitudinal shaft, and carrying a drill having its axis of rotation at an angle with said shaft, the shaft and drill being connected together by appropriate beveled gears. In the particular form of the device herein shown the arm is adapted for attachment to the rotating work-holder or bed of a drilling-machine, and the said transverse driving-shaft is arranged vertically and formed at its upper end to enter the drill-socket of the spindle of said machine and connected by means of beveled gears with the horizontal shaft in the arm. In this adaptation of the device the arm will preferably be provided with lugs arranged to rest upon the top horizontal surface of the bed of the drill, through which lugs may be inserted bolts for holding the arm in definite relation to the upright spindle and to hold said arm suitably rigid for the purpose of sustaining the drill at the outer end of the arm in proper position with reference to the work. As an attachment for such an upright drill, or for other suitable machine adapted for actuating it, my invention gives two motions, one of which is a swinging motion of the arm about the prolonged axis of the driving-spindle and the other a swiveled or rotative motion of the drill-carrying head at the outer end of the arm, by which the said drill may be pointed and driven in any desired direction radially of the longitudinal shaft.

Figure 3:
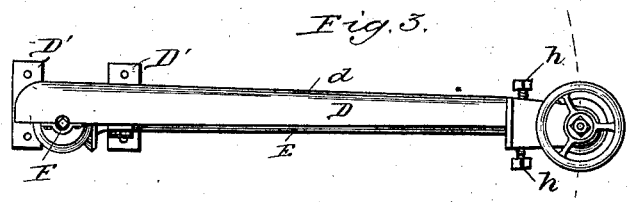
Figure 2:
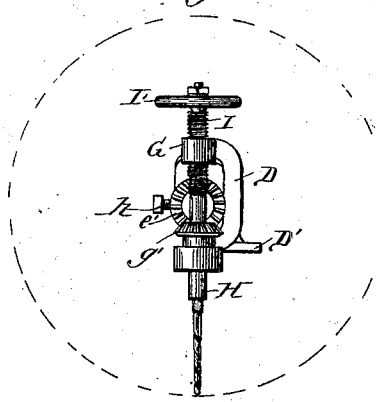

Referring to the accompanying drawings for a fuller understanding of my invention, Figure 1 is a side elevation of an upright drill-machine shown in dotted lines, a side view of the horizontal swinging arm, and a vertical section of the drill-head swiveled upon the outer end of said arm. Fig. 2 is a front view of the swiveled head, showing the drill in vertical position and directed downwardly. Fig. 3 is a top view of the horizontal arm and swiveled drill-head.

A represents in dotted lines an upright drill of familiar construction, of which B is the drill-spindle, and C is the horizontal bed or table upon which the work to be drilled is placed. D is the arm or frame of my improved machine or attachment, which is provided near one end with lugs D' D', by which it may be bolted or otherwise secured to the top surface of the bed or table C, so as to overhang the latter. The connection between the arm and the table will usually be formed by means of headed bolts inserted in T-grooves in the table and engaging the lugs in a familiar manner. The arm or frame D is preferably cast in the form of a shell open at one side and provided with a vertical web, *d*, and in said frame is mounted a longitudinal rotating shaft, E, having bearings at its inner end, or that adjacent to the bed C, in a bearing, *d'*, cast upon or secured to the web *d*, and passing at its outer end through and having bearings in a sleeve or tubular extension, $d^2$, formed upon or attached to the outer end of the said frame D. At the inner end of said frame is mounted a transverse shaft, F, having bearings $d^3$ $d^4$ at the sides of the frame, and provided with a beveled gear-wheel, $f$, intermeshing with a gear-wheel, $e$, upon the adjacent end of the shaft F, said shaft F being extended beyond the frame at one side of the latter, and squared at its end, or otherwise adapted to engage the drill-spindle B of the machine A. The sleeve or tubular extension $d^2$ at the outer end of the frame D affords bearing for a rotative yoke or head, G, carrying a drill-spindle, H, arranged at right angles to the shaft E, with its axis of rotation in alignment with the axis of said shaft, said spindle being actuated by means of a beveled gear-wheel, $e'$, upon the shaft E intermeshing with a beveled gear-wheel, $g'$, attached to a sleeve, $g$, mounted in the head G and surrounding the spindle H, said sleeve being connected with the spindle by a spline and groove, whereby the rotary motion of the sleeve is transmitted to the spindle, while at the same time the spindle is freely movable longitudinally in said sleeve.

A suitable feed device will be provided for advancing the drill-spindle H toward the work, that herein shown consisting of a sleeve, I, within which the spindle is mounted to rotate freely, but not to move endwise, and which is screw-threaded upon its exterior surface to engage a threaded aperture in the head G, said sleeve I being provided with a hand-wheel, $I'$, whereby it may be turned, and the drill thereby advanced and retracted, as desired. The axis of rotation of the head G upon the sleeve $d^2$ is coincident with the axis of the shaft E, so that when the said head G is rotated the beveled gears $c'$ and $g'$ will remain in engagement, and power will be transmitted equally well when the drill is turned in any direction.

To hold the head with the drill in a desired position for operation, clamping devices of any well-known or preferred construction may be used, those herein shown consisting of set-screws $h$ $h$, inserted through the head H and bearing upon the sleeve $d^2$. The said head H may be of any desired form, but is herein shown as consisting of two oppositely-extending arms terminating in parallel parts provided with suitable enlarged portions to afford bearings for the spindle-supporting sleeves $g'$ and I.

The machine herein shown in dotted lines is provided with a work-holder or table, C, constructed to rotate upon a vertical axis in alignment with the axis of the machine spindle in a familiar manner. In the use of my device in connection with a machine of this character the arm will be bolted to the table with the upper end of the spindle E engaged with the tool-holder of the drill-spindle B, the revolving table being clamped or otherwise held immovable while the drill carried by the arm is in operation. The employment of the device described in connection with or as an attachment to a drilling-machine having a revolving table is of advantage, inasmuch as when the arm D of said attachment is secured to the table, as above described, the tool mounted upon said arm may, by turning the table, be swung bodily in a circular path, so as to afford a wide range of movement in the drill, while preserving the engagement of the shaft E with the spindle B of the machine. The device described may, however, be used with advantage in connection with drilling-machines having non-rotatable tables, in which case the arm D may be secured to the table in proper position for the operation of the tool carried thereby to the work, the horizontal movement in all directions usually given to said tables obviously enabling the shaft E to be accurately centered beneath the spindle B in the operation of attaching the device thereto.

The device constructed as described may obviously be employed in connection with machines of other kinds having a suitable rotating part or spindle with which the shaft E may be connected—as, for instance, a lathe—any suitable means being employed for sustaining the arm D rigidly in a desired position.

A device embracing the general features of construction set forth may be used otherwise than in connection with a machine having a driving-spindle, and in such case power may be transmitted to the shaft E in any way found desirable or convenient—as, for instance, by means of a belt-pulley upon the said shaft, as is indicated in the drawings, Fig. 1. When used otherwise than in connection with a machine having a slotted table or work-holder, the arm D will be attached to a suitable stationary support by bolts passing through the lugs $D'$ $D'$, or in any other suitable manner.

I claim as my invention—

1. A portable drilling apparatus consisting of an arm or frame, D, a longitudinal shaft mounted in said frame, a rotative head, G, mounted upon the frame concentrically with the shaft, a transversely-arranged tool-holding spindle mounted in said head, gear-connections between said shaft and spindle, clamping devices for holding the head from rotation upon the frame, a shaft, F, mounted transversely in the frame and adapted for connection with a driving device, and gear-connections actuating the shaft E from the shaft F, and means upon one end of said arm or frame for detachably connecting the latter with a suitable support, substantially as described.

2. The combination, with an arm or frame adapted for attachment to a support, of a longitudinal shaft, E, having bearings in said frame, a shaft, F, mounted in said frame and shaped at one end for engagement with the tool-holder of a drilling or other machine, gear-connections between said shafts E and F, a tool-holding spindle mounted transversely at the outer end of the frame, and gear-connections between said shaft E and the said spindle, substantially as described.

3. The combination, with an arm or frame,

D, provided at one end with lugs $d$ for attachment to a support, and having a tubular prolongation or sleeve, $d^2$, at its end remote from said lugs, of a longitudinal shaft, E, having bearings in said frame and extending through said sleeve $d^2$, a shaft, F, arranged transversely to the shaft E at the end of the frame adjacent to the said lugs, said shaft F being shaped upon one end for engagement with the tool-holder of a drilling or other machine, gear-connections between the shafts F and E, a head, G, mounted to rotate upon the sleeve $d^2$, a tool-spindle mounted in said head, and a clamping device for holding the head from rotation upon the sleeve, substantially as described.

4. The combination, with the arm or frame D, of the longitudinal shaft E, mounted in said frame, a rotative head, G, mounted upon the frame concentrically with the said shaft, a tool-spindle, H, mounted in the said head, means for actuating the said spindle from the shaft E, comprising a beveled gear-wheel, $e'$, upon the shaft, a gear-wheel, $g'$, intermeshing with the gear-wheel $e'$, and a sleeve, $g$, attached to the said gear-wheel $g'$, said shaft and sleeve being connected by a spline and groove, and a sleeve, I, engaging the said spindle and having screw-threaded engagement with the head, said sleeve being provided with a hand-wheel, I', substantially as described.

In testimony that I claim the foregoing as my invention I affix my signature in presence of two witnesses.

JOHN O'NEIL.

Witnesses:
EDWARD GILBERT,
HENRY C. GILBERT.